Figure 1:
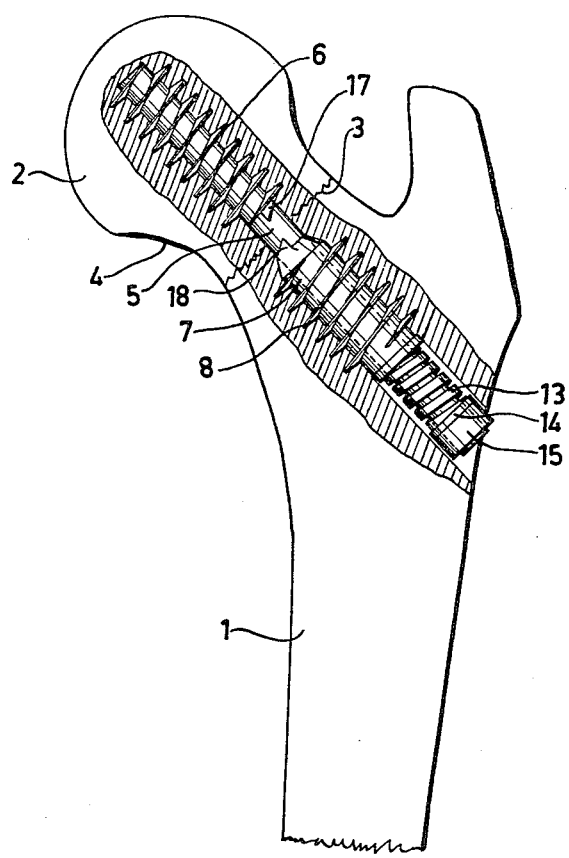

Aug. 28, 1962     GUSTAF-BERTIL L. GRATH     3,051,169
SURGICAL SCREW CONNECTOR
Filed Dec. 5, 1958

# United States Patent Office 3,051,169
Patented Aug. 28, 1962

3,051,169
SURGICAL SCREW CONNECTOR
Gustaf-Bertil Leonard Grath, Goteborg, Sweden, assignor to Aktiebolaget Stille-Werner, Stockholm, Sweden, a corporation of Sweden
Filed Dec. 5, 1958, Ser. No. 778,415
5 Claims. (Cl. 128—92)

This invention relates to means for use in repairing fractures of bones of the body, and more particularly fractures of the neck of the leg bone or femur. In operations involving these parts, it is known to use screw connections between the fractured parts and by the use of spring means the broken parts are forced together and the healing thereby facilitated and expedited.

It is an object of the present invention to provide a type of screw or pin connector which includes a screw adapted to be inserted through the upper part of a femur in the direction of the femur head and to be anchored with its threaded end in the head. The invention further contemplates the employment of a sleeve or tube arranged around the screw and adapted to be fixed on the upper portion of the femur in a manner to guide the screw in movement in a radial direction, and it further includes a nut threaded on the outer end of the screw. Provided on the screw is a coil spring having one end in abutment against the sleeve and its other end bearing against the nut. Thus, by tightening the nut, the head of the femur at the neck or point of fracture, will be resiliently adjusted against the femur to thereby regulate the setting pressure to a predetermined extent.

A disadvantage often encountered with previous types of screw connectors has been that it was not always possible to obtain a constantly stable fastening to form the guidance for the screw, especially after the patient, following the operation, began to walk. Some types of connectors exhibited a tendency to give upon the imposition of increased weight, and this often resulted in the displacement of the broken parts at the point of fracture.

According to the present invention, this objection is eliminated by the fact that the sleeve employed as a part of this device, is provided with external threads, thereby permitting it, after the insertion of the screw in the bone, to be screwed or threaded in the bone to the depth required by the location and form of fracture. By this construction, a device is attained which requires considerably less space due to the fact that the usual extension of the sleeve, that in previous constructions was fastened on the outside of the bone, is eliminated. Furthermore, in the same prior constructions a part of the sleeve which housed a spring, projected to a substantial extent from the actual bone contour and often caused great discomfort to the patient. By a special formation of an externally threaded sleeve employed in this part, the device can accommodate a considerably longer spring than was used in prior constructions and without any part of the screw connector projecting to any real extent outside of the bone contour. By reason of this increased spring length it is possible to continue the spring pressure even after the broken parts have partially telescoped one another, and which sometimes results in a shortening of the femur neck.

With these and other objects to be hereinafter set forth in view, I have devised the arrangement of parts to be described and more particularly pointed out in the claims appended hereto.

Figure 2:
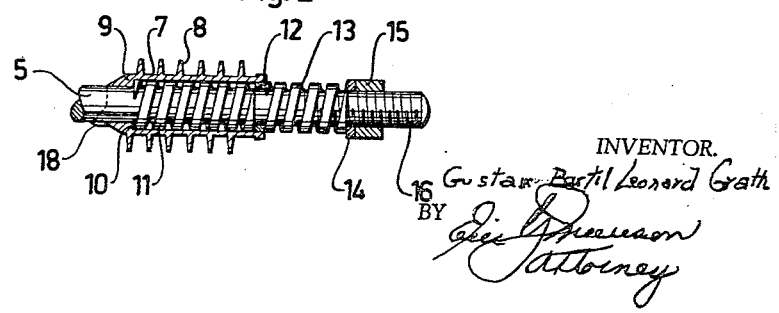

In the accompanying drawing, wherein an illustrative embodiment of the invention is disclosed, FIG. 1 is a side view, partly in section of the upper part of the fractured femur with an inserted screw connector made according to the present invention;

FIG. 2 is a longitudinal sectional view through the screw connector and in which the threaded inner part of the screw is omitted.

In FIG. 1 the femur bone is designated with the numeral 1; the ball head thereof indicated at 2, the neck shown at 4 and the fracture across the neck is designated by the numeral 3. The screw connector consists primarily of a screw 5, formed with threads 6 on its inner end which is threaded in and anchored in the ball head 2. The connector additionally includes a sleeve 7, fitted over the screw 5 and provided with external threads 8 which are threaded into the femur bone to the position substantially as shown in FIG. 1. The sleeve 7, at its inner end 9 (FIG. 2), is of such an internal diameter that it fits snugly around the unthreaded shaft portion of the screw 5, but for the remainder of its length it has a somewhat larger internal diameter in order to accommodate a helical spring 11 which is displaceable on the screw 5 and which is arranged with one end against the shoulder that forms the transition between the two different internal diameters of the sleeve. At the outer end, and in the drawing to the right, the sleeve 7 carries a spacing ring 12 which centers the sleeve 7 on the screw 5. Outside of the ring 12 is another helical spring 13 which, by means of an intermediate disk or washer 14, is supported against a nut 15 threadably adjustable on the threaded outer end 15 of the screw 5.

The connector is applied in the following manner:

After the broken bones are set in the proper position by means not pertinent to the present invention, a channel or passage is bored in the ball head 2 of the bone past the point of fracture 3 and which channel or passage has a diameter selected according to the diameter of the shaft of the screw 5. Thereafter a thread tap is inserted into the ball head 2 and which cuts threads corresponding to the threads 6. The screw 5 is then threaded into place in the ball head and thereafter the sleeve 7 is screwed into position therein.

Then the spring 11 is inserted around the screw 5 and within the sleeve, and the spacing ring fitted in place followed by the spring 13, the washer 14 and then the connector is tightened by means of the nut 15. The threads 8 on the sleeve and the threads 6 on the end area of the screw are preferably of the same pitch and this somewhat facilitates the threaded insertion of the parts into the bored channel or passage and also makes possible a simultaneous removal of the screw 5 and the sleeve 7 when the connector is to be removed. For this purpose, the screw 5 is provided at the end of the threads 6 toward its shaft, with a spur 17 or similar coupling element which, when the screw is unthreaded, engages with a corresponding spur 18 or other coupling device on the forward end of the sleeve 7 which faces the point of fracture 3 so that the sleeve will be carried along with the screw. As a result, the entire connector is removable as a unit without any further disturbance of the bone susbtance in the channel or passage. The screw 5 and the sleeve 7 are selected with a suitable length of the respective threads according to the location of the fracture 3, in order to provide the best possible anchorage.

Thus, in the situation shown, it is possible to use a screw with a comparatively large number of threads 6 while the number of threads on the sleeve 7 can be somewhat less. If the point of fracture should be located closer to the ball head 2, a screw should be selected with a less number of threads and with the sleeve having an increased number. Furthermore, as many springs 11 and 13 can be employed as each particular situation requires.

The connector made according to the invention can therefore be provided in separate parts, which parts can readily be combined in the most suitable manner according to the individual requirements of each case.

A special advantage following from the construction of the sleeve 7 is that the total length of the springs can be considerably greater than those employed in previous constructions, so that the adjustment pressure can be regulated within certain limits without the connector projecting to any substantial extent outside of the contour of the bone as will be clear from FIG. 1. In many cases it is even possible to locate the connector entirely within the bone and in such cases the nut 15 may be threaded in sufficiently to cause it to enter the sleeve 7. The nut 15 must, in such a case, be made cylindrical and must have approximately the same outside diameter as the spacing ring 12 which it can then replace.

Having described a single embodiment of the invention, it is obvious that the same is not to be restricted thereto, but is broad enough to cover all structures coming within the scope of the annexed claims.

What I claim is:

1. A surgical screw connector for use in connection with fractures of the femur neck comprising, a screw inserted into the upper part of the femur in the direction of the ball head thereof, said screw having a threaded end anchored in the ball head, a sleeve arranged around the screw and fixed in the upper part of the femur and arranged to control any movement of the screw in a radial direction, a nut threaded on the outer end of the screw, helical springs displaceable on the screw and which springs abut at one end against the sleeve and abut at the other end against the nut, whereby the adjustment of the nut on the screw will cause the femur head at the point of fracture to be resiliently set against the femur, the sleeve having external threads so arranged that after the screw has been inserted into a previously prepared bore and the sleeve threaded therein to a position selected according to the location and shape of the fracture, a stable fastening will result.

2. A surgical screw connector for use in connection with fractures of the femur neck comprising, a screw inserted into the femur across the fracture therein, said screw having a threadless shank portion, a sleeve having a forward end of an internal diameter closely fitting around the shank of the screw, the sleeve having external threads of a pitch similar to the pitch of the threads on the screw, the sleeve having an internal diameter rearwardly of its forward end of a size substantially greater than the diameter of the screw, a spring located within the sleeve and surrounding the shank of the screw, means closing the rear end of the sleeve and confining the spring within the sleeve, an adjusting nut on the screw rearwardly of the sleeve-closing means, and a spring surrounding the shank of the screw between the said sleeve-closing means and the adjusting nut, and co-operating means on the screw and sleeve to cause unthreading movement of the sleeve when the screw is unthreaded.

3. A surgical screw connector for use in connection with fractures of the femur comprising, a screw inserted into the femur and across the fracture therein, said screw having a forward externally-threaded portion and with a rear externally-threaded portion and provided with a threadless portion between the forward and rear threaded portions, a sleeve having a forward end of an internal diameter closely fitting the shank of the screw over the threadless portion thereof, said sleeve having external threads of a pitch similar to the threads on the forward portion of the screw, the sleeve having an internal diameter rearwardly of its forward end of a size substantially greater than the diameter of the threadless part of the screw, an annular shoulder provided within the sleeve adjacent to its forward end, a spring located within the sleeve and encircling the shank of the screw and having one end bearing against the shoulder, a disc closing the rear end of the sleeve, the second end of the spring bearing against the disc, a second spring surrounding the screw to the rear of the sleeve, said second spring having one end bearing against the disc, and an adjusting nut on the threaded rear portion of the screw and against which the second end of the second spring bears.

4. A surgical screw connector for use in connection with fractures of the femur neck comprising, a screw inserted into the upper part of the femur in the direction of the ball head thereof, said screw having a threaded end anchored in the ball head, a sleeve arranged around the screw and fixed in the upper part of the femur and arranged to control any movement of the screw in a radial direction, a nut threaded on the outer end of the screw, helical springs displaceable on the screw and which springs abut at the other end against the nut, whereby the adjustment of the nut on the screw will cause the femur head at the point of fracture to be resiliently set against the femur, the sleeve having external threads of the same pitch as the threads on the screw, the threads on the sleeve being so arranged that after the screw has been inserted into a previously prepared bore and the sleeve threaded therein to a position selected according to the location and shape of the fracture, a stable fastening will result, the screw and the sleeve being provided with interengaging coupling members operative to cause unthreading movement of both the screw and sleeve upon removal of the connector.

5. A surgical screw connector as provided for in claim 4, wherein the interengaging coupling members consist of a projecting spur provided on the screw and a co-operating spur provided at the forward end of the sleeve, said spurs being brought into engagement upon unthreading movement of the screw to thereby result in unthreading movement of the sleeve in company with the screw.

References Cited in the file of this patent

UNITED STATES PATENTS

| | | |
|---|---|---|
| 2,243,717 | Moreira | May 27, 1941 |
| 2,382,019 | Miller | Aug. 14, 1945 |
| 2,397,545 | Hardinge | Apr. 2, 1946 |
| 2,414,882 | Longfellow | Jan. 28, 1947 |
| 2,801,631 | Charnley | Aug. 6, 1957 |